United States Patent Office 2,744,125
Patented May 1, 1956

2,744,125

ISOLATION OF FATTY ACIDS FROM GUAYULE RESIN

James W. Meeks and Thomas F. Banigan, Jr., Salinas, Calif., assignors to the United States of America as represented by the Secretary of Agriculture No Drawing. Application April 10, 1953, Serial No. 348,135

4 Claims. (Cl. 260—413)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the isolation of fatty acids from guayule resin and has among its objects the provision of processes for isolating fatty acids, particularly linoleic acid, stearic acid and palmitic acid, in high yield and in comparatively pure state from guayle resin.

The term "guayule resin" is used herein in the same sense as commonly used in the industry, i. e., as meaning those constituents of the guayule shrub (*Parthenium argentatum*, Gray) that are obtained when the comminuted shrub or the resinous rubber prepared from such shrub is extracted with acetone, ethyl alcohol, or similar oxygenated organic solvents well known in the art of preparing deresinated rubber. Based on the dry weight of the shrub this resin fraction constitutes about 6–9%, and on the dry weight of the milled rubber about 20–25%. The composition of this resin tends to vary somewhat, at least in percentage composition with regard to the primary components, depending on the choice of deresinating solvent employed.

Prior investigations on the composition of guayule resin have shown that it contains parthenyl cinnamate, a hard wax-like compound of unknown composition, and essential oils—mainly alpha-pinene plus small percentages of dipentene, cadinene, and other terpenaceous hydrocarbons and alcohols.

It has now been found that guayule resin contains substantial amounts of high molecular weight fatty acids, particularly linoleic acid, palmitic acid, and stearic acid. These acids are present in the resin in the approximate amounts of 37%, 4%, and 1.6%, respectively. Methods for isolating the acids in high yield have been devised and constitute the primary object of this invention.

In general, the process of the present invention involves saponifying guayule resin with an alkaline reagent. From the saponification reaction product, non-saponified substances are extracted with an organic solvent. The remainder of the saponification reaction product is neutralized with an acid to precipitate the crude fatty acids. To remove dark-colored impurities, the crude fatty acids may be dissolved in an organic solvent and subjected to decolorization with activated charcoal or similar adsorbent materials. The purified fatty acids are then subjected to a fractionation treatment to separate the individual components of the mixture. To this end, the fatty acids are dissolved in a solvent such as acetone. The temperature of the resulting solution is reduced in stages. Since the saturated fatty acids are less soluble than the linoleic acid they will crystallize out at higher temperatures whereas the linoleic acid will not crystallize until the temperature is drastically lowered. The stepwise reduction in temperature thus offers a convenient technique for isolating the components of the fatty acid mixture.

An advantage of the present process is that the essential oils, partheniol, and other non-fatty acid constituents of the guayule resin can also be recovered. Thus when the saponification mixture is extracted, the various non-fatty acid substances can be recovered from the extract containing the non-saponifiable substances. For example, this extract may be subjected to fractional distillation to isolate the essential oil. Since the essential oil consists largely of alphapinene it can be used as a solvent, particularly in paints, and can also be used as an intermediate in the preparation of lubricating oil addition agents, and so forth.

A description of the present process in greater detail is as follows:

The guayule resin is first subjected to saponification. This is preferably accomplished by subjecting the resin at about from 20°–100° C. to the action of an aqueous alkaline reagent such as sodium hydroxide, potassium hydroxide, sodium carbonate, potassium carbonate, etc. The alkaline reagent is preferably used in excess over the theoretical amount as determined by the saponification equivalent of the resin in order to ensure completion of the reaction. If desired, the guayule resin may be treated to remove at least some of the non-fatty acid components prior to the saponification. Thus the guayule resin may be subjected to steam distillation or vacuum distillation to remove the essential oil (mostly alpha-pinene) and then subjected to the saponification step as above described. Another alternative is to subject the saponification reaction mixture (guayule resin and aqueous alkaline reagent) to steam distillation or vacuum distillation whereby violatile components such as the essential oils can be isolated while the saponification is taking place.

After the saponification step has been completed, the reaction mixture is extracted with an organic, water-immiscible fat solvent to remove the non-saponifiable substances. As the solvent one may use, for example, diethyl ether, benzene, perchloroethylene, trichloroethylene, carbon tetrachloride, ethylene dichloride, hexane, heptane, petroleum ether, gasoline, Stoddard solvent, naphtha, benzine, or other light petroleum distillates. The solvent extract may be treated to recover the essential oil, partheniol, and other non-saponifiable components therein.

The extracted saponification mixture is then neutralized with an acid such as hydrochloric, sulphuric, phosphoric, acetic, etc. whereby to precipitate the crude fatty acids. Preferably, enough acid is added to render the mixture at least slightly acidic to ensure complete release of the acids from their salts.

To purify the crude fatty acids, several purification techniques may be applied. Thus the crude fatty acids may be washed with hot water to remove cinnamic acid and other water-soluble impurities. Dark-colored impurities may be removed by dissolving the crude material in a fat solvent, as listed above, and treating the solution with active carbon, fuller's earth, or other adsorbent material which exerts a decolorizing action. Oily impurities of a non-acidic nature can also be removed by dissolving the crude fatty acids in a minimum effective quantity of an organic solvent and allowing the solution to stand whereby the oily non-acidic compounds will settle out and the purified solution can be decanted from the precipitated impurities. As the solvent for this purification one can use any of the fat solvents listed above or an alkanol for example methanol, ethanol, propanol, isopropanol, the various isomeric butanols, and so forth. The steps of dissolving in a solvent, allowing to stand, and separating the solution from undissolved matter may be repeated several times to achieve maximum purification of the mixed fatty acids.

The purified fatty acids may then be treated to separate the saturated and unsaturated fractions. This is preferably accomplished by fractional crystallization which involves dissolving the fatty acids in an organic solvent such as acetone, ethanol, methanol, hexane, petroleum ether, petroleum naphtha, etc. and then reducing the temperature of the solution in stages. Since the saturated acids are less soluble than the unsaturated acids, the former will crystallize out before the latter and thus their separation can be effectuated. Generally the palmitic and stearic acids crystallize in the form of a eutectic mixture containing 72.5 mole percent of palmitic acid and 27.5 mole percent stearic acid. The linoleic acid crystallizes essentially as such with a small percentage of linolenic acid as a contaminant. The saturated acid fraction and the linoleic acid fraction may each be puried by crystallization from acetone, hexane or other fat solvent as described above.

The fractional crystallization may be carried out on the solution of puried fatty acids obtained in the preceding step. To illustrate: The crude fatty acids as obtained by neutralizing the extracted saponication mixture are dissolved in petroleum ether or other fat solvent or alkanol, as described above. The resulting solution is allowed to stand whereby dark-colored, tarry impurities will settle out and the purified solution can be decanted from the precipitated impurities. The resulting solution can then, in many cases, be directly used in the fractional crystallization procedure by lowering its temperature in stages thus to crystallize first the saturated fatty acids and eventually the unsaturated fatty acids.

Although the above-described fractional crystallization technique is preferred, other methods may be employed to separate the saturated and unsaturated fatty acids. As an example, the mixed fatty acids may be converted into their lead salts. By washing the mixed lead salts with alcohol or ether the lead salts of the unsaturated fatty acids will for the most part go into solution whereas the lead salts of the saturated fatty acids will remain essentially undissolved. Another technique is to brominate the mixed acids and separate the brominated products of the saturated and unsaturated fatty acids on the basis of their respective solubilities in organic solvents. Still another technique is to separate the saturated and unsaturated fatty acids by flowing columnar chromatography with adsorbents such as activated alumina or silica gel.

The fractional crystallization or other technique adapted to separate the saturated and unsaturated fatty acids can be omitted if desired, thus to yield a final product containing both unsaturated and saturated fatty acids. Such a mixture is useful industrially, particularly since it contains linoleic acid as the chief component. Using this modification of our process, one would proceed with the saponification, extraction, and neutralization steps as described above. The resulting crude fatty acids are then preferably purified to remove dark-colored, tarry impurities. To this end, the crude fatty acids are dissolved in petroleum ether or other fat solvent or alkanol as described above and the solution allowed to stand whereby tarry impurities will settle out and the purified solution can be decanted from the precipitated impurities. Decolorization with active carbon, etc. can also be applied while the fatty acids are dissolved in the solvent. By distillation of the organic solvent, there remains a residue the purified mixed fatty acids which are useful for many purposes.

The recovered acids may be used for various purposes. For example, drying oils may be prepared by esterifying the linoleic acid with glycerine, pentaerythritol, dipentaerythritol or other polyhydric alcohols. Alkyd resins may be prepared by condensing the linoleic acid with maleic or phthalic anhydride and a polyhydric alcohol. Soaps both water-soluble and water-insoluble may be prepared from either the saturated fraction, the unsaturated fraction or even the mixture of both by saponifying with an alkali metal hydroxide or alkaline earth metal hydroxide.

The following example illustrates the invention in greater detail.

EXAMPLE

(A) Saponification

Four kilograms of crude guayule resin obtained as a byproduct from the acetone deresination of guayule rubber was reacted with a solution of 400 g. of sodium hydroxide (25 mole percent excess based on saponification equivalent 498) in 5 liters of water. The saponification was conducted with stirring at 95° C. for 2 hours.

(B) Extraction of non-saponifiables

The saponification reaction mixture was diluted with water, cooled and extracted twice with petroleum ether and thrice with diethyl ether using a total quantity of 3 gallons of petroleum ether and 5 gallons of diethyl ether. The petroleum ether and diethyl ether extracts were evaporated to remove these solvents thus yielding a total of 1883 grams of unsaponifiable material.

(C) Liberation and purification of fatty acids

The saponification product from which the unsaponifiables had been extracted was neutralized with hydrochloric acid whereby over two liters of a thick black oil containing the fatty acids was precipitated. The color of this oil was lightened by dissolving it in 4 gallons of diethyl ether and agitating the solution with 50 grams of activated charcoal. The clarified solution was subjected to evaporation to remove the solvent and the residual material was dissolved in 4 gallons of petroleum ether. After two hours' standing, the supernatant liquid was decanted from 104 g. of black tarry material. The decanted solution was agitated with 50 grams of activated charcoal, filtered, the solvent evaporated and the residue dissolved in 4 gallons of methanol. The methanol solution was allowed to stand several hours and the supernatant solution was decanted from 16 grams of an oily non-acidic substance. The decanted solution was agitated with 50 grams of activated charcoal, filtered and the solvent evaporated thus to yield 1920 grams of the mixture of saturated and unsaturated fatty acids in the form of a pale yellow oil.

(D) Separation of saturated and unsaturated acids

A 400-gram portion of the oil containing the saturated and unsaturated fatty acids was dissolved in 3.6 kilograms of acetone and the solution subjected to a temperature of minus 20° C. for several hours. A white waxy precipitate containing saturated fatty acids was removed from the solution. The solution was then chilled to minus 40° C. and after standing, additional precipitate of saturated fatty acids was removed.

(E) Final purification of unsaturated fraction

The solution from which the saturated acids had been precipitated was successively cooled to minus 55° C. and minus 75° C. and the precipitate of unsaturated fatty acids produced at each of these stages was removed. The precipitates were combined and recrystallized from acetone and then from hexane at minus 60° C. A yield of 160 grams of linoleic acid was obtained. An additional 122 g. of linoleic acid (total yield 282 g.) was isolated from the combined filtrates from the crystallization.

The product was subjected to analysis with the following results:

| | |
|---|---|
| Melting point, °C | −8.5 |
| Percent carbon | 76.5 |
| Percent hydrogen | 11.4 |
| Density, $d_4^{20}$ | 0.9036 |
| Index of refraction, $n_d^{20}$ | 1.4704 |
| Mol. wt. (neut. equiv.) | 281 |
| Iodine No. (Hanus) | 175 |
| Tetrabromide: | |
| M. P. °C | 114–114.5 |
| Percent bromine | 53.22 |
| Hydrogenation | Stearic acid |

On the basis of these data and the fact that the tetrabromide contained a small amount of hexabromide, the product was identified as alpha-linoleic acid containing about 1.4% of linolenic acid.

(F) Purification of saturated fraction

The precipitates separated in part D were recrystallized from acetone and then hexane to yield 35 grams of white waxy crystals (palmitic-stearic acid eutectic). This product was subjected to analysis with the following results:

| | |
|---|---|
| Melting point, °C | 54–54.5 |
| Percent carbon | 75.4 |
| Percent hydrogen | 12.7 |
| Mol. wt. (neut. equiv.) | 269 |
| Iodine No. (Hanus) | 1.1 |

On the basis of these data the product was identified as a eutectic mixture of palmitic and stearic acids in the ratio of 72.5 to 27.5 mol. percent, respectively.

Having thus described our invention, we claim:

1. A method of isolating fatty acids from guayule resin which comprises saponifying the resin at a temperature of about from 20 to 100° C. with an aqueous solution of an alkaline reagent, extracting non-saponified substances from the resulting saponification reaction mixture with an organic, water-immiscible fat solvent, acidifying the remaining material to liberate the fatty acids and collecting these fatty acids.

2. A method of isolating fatty acids from guayule resin which comprises saponifying the resin at a temperature of about from 20 to 100° C. with an aqueous solution of an alkaline reagent, extracting non-saponified substances from the resulting saponification reaction mixture with an organic, water-immiscible fat solvent, acidifying the remaining material to liberate the fatty acids, collecting these fatty acids, then subjecting a solution of the fatty acids in an organic solvent to cooling at successively lower temperatures to successively precipitate the saturated fatty acids, then the unsaturated fatty acids, and collecting the successive precipitates.

3. A method of isolating linoleic acid from guayule resin which comprises saponifying the resin with an aqueous solution of an alkaline reagent at a temperature of about from 20 to 100° C., extracting non-saponified substances from the resulting saponification reaction mixture with an organic water-immiscible fat solvent, acidifying the remaining material to liberate the fatty acids, collecting the liberated fatty acids, purifying the fatty acids by treatment with activated carbon and by dissolving in an organic solvent and removing insoluble contaminants from the solution, then subjecting a solution of the purified fatty acids to cooling at successively lower temperatures to successively precipitate the saturated fatty acids then linoleic acid, and isolating the precipitated linoleic acid.

4. A method of isolating a mixture of palmitic and stearic acids from guayule resin which comprises saponifying the resin with an aqueous solution of an alkaline reagent at a temperature of about from 20 to 100° C., extracting non-saponified substances from the resulting saponification reaction mixture with an organic water-immiscible fat solvent, acidifying the remaining material to liberate the fatty acids, collecting the liberated fatty acids, purifying the fatty acids by treatment with activated carbon and by dissolving in an organic solvent and removing insoluble contaminants from the solution, then subjecting a solution of the purified fatty acids to cooling to precipitate a mixture of stearic and palmitic acids, and separating this mixture.

References Cited in the file of this patent
UNITED STATES PATENTS

| | | |
|---|---|---|
| 2,152,666 | Rosenthal | Apr. 4, 1939 |
| 2,571,221 | Dupont et al. | Oct. 16, 1951 |
| 2,572,046 | Meeks et al. | Oct. 23, 1951 |